United States Patent
Pawlak, III et al.

(10) Patent No.: US 6,234,398 B1
(45) Date of Patent: May 22, 2001

(54) MOTOR VEHICLE AUTOMATIC HVAC CONTROL WITH OPEN LOOP TRANSIENT COMPENSATION

(75) Inventors: John Lawrence Pawlak, III, Orchard Park; Sean Michael Kelly, Williamsville, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/456,236

(22) Filed: Dec. 7, 1999

(51) Int. Cl.$^7$ .................................................. G05D 23/00
(52) U.S. Cl. ........................ 236/91 C; 236/91 F; 62/131; 62/133
(58) Field of Search ................................ 236/91 C, 91 F, 236/91 E, 91 R, 46 R, 46 A, 46 F, 47; 62/133, 131, 239, 244; 165/202, 203, 204, 42, 43

(56) References Cited

U.S. PATENT DOCUMENTS

| | | | |
|---|---|---|---|
| 4,345,714 | 8/1982 | Kojima | 236/165 |
| 5,003,785 | * 4/1991 | Petri et al. | 62/131 |
| 5,209,398 | 5/1993 | Drees | 236/165 |
| 5,810,078 | 9/1998 | Knutsson et al. | 165/236 |
| 5,944,256 | * 8/1999 | Arai et al. | 236/91 C X |
| 6,012,295 | * 1/2000 | Isobe et al. | 62/131 |
| 6,055,817 | * 5/2000 | Wieszt | 62/133 |
| 6,123,146 | * 9/2000 | Dias | 236/91 C X |

* cited by examiner

Primary Examiner—Harry B. Tanner
(74) Attorney, Agent, or Firm—Patrick M. Griffin

(57) ABSTRACT

An improved performance and cost-effective control for an automatic motor vehicle HVAC system in which the system variables are controlled without regard to a measured in-car temperature during steady-state conditions, and in which the steady-state control is modified during transient conditions by a time-dependent open-loop compensation term, INCAR. The initial value of INCAR, a target value and a time rate of change are initialized as a function of environmental and system conditions at the onset of the transient condition. At ignition key-on, INCAR is initialized in accordance with an estimate of the in-car temperature, and exponentially adjusted toward a predetermined reference temperature (target), such as 75°, at a rate determined by the initial temperature, preferably with adjustments being made for door opening and closing. At ignition key-off, INCAR is initialized at its current value, and exponentially adjusted toward a target temperature based on ambient air temperature and solar loading, to form a basis for in-car temperature initialization at the next ignition key-on. For extended key-off periods, system temperature sensors may be used to initialize INCAR.

15 Claims, 5 Drawing Sheets

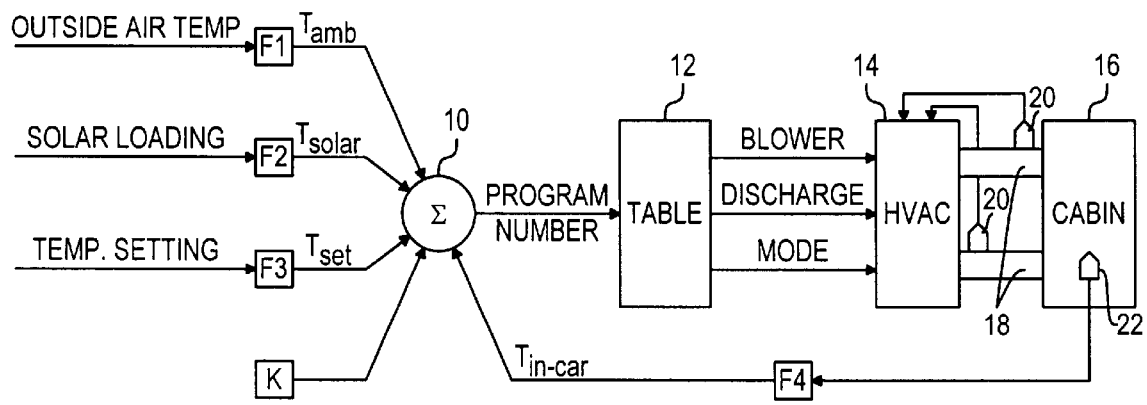
FIG. 1A - PRIOR ART
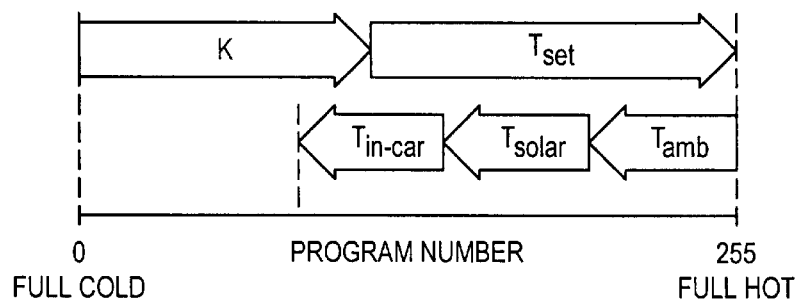
FIG. 1B - PRIOR ART
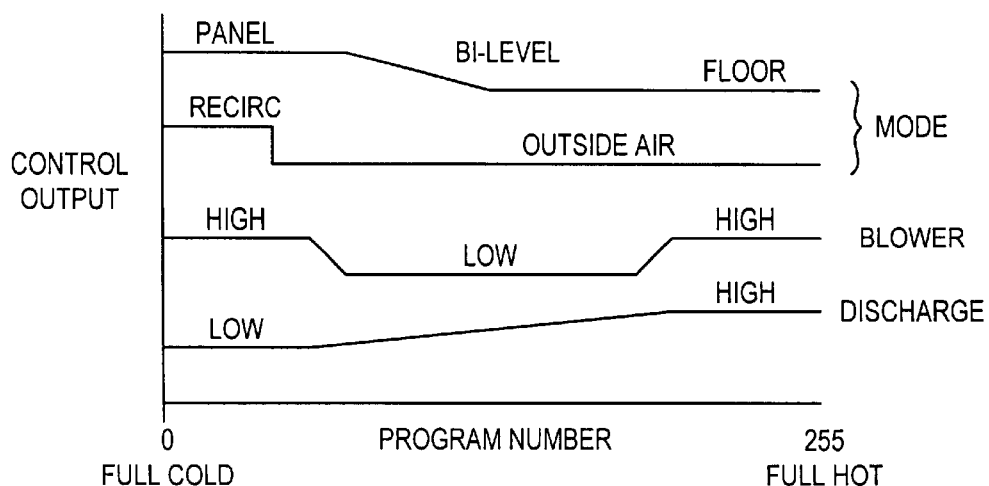
FIG. 1C - PRIOR ART

MOTOR VEHICLE AUTOMATIC HVAC CONTROL WITH OPEN LOOP TRANSIENT COMPENSATION

TECHNICAL FIELD

This invention relates to the control of an automatic Heating-Ventilation-Air-Conditioning (HVAC) system for a motor vehicle, and more particularly to a control that does not include a cabin air temperature sensor.

BACKGROUND OF THE INVENTION

With a motor vehicle automatic HVAC control, the operator sets a desired temperature for the vehicle cabin, and an electronic control module controls the blower speed, air discharge temperature and air delivery mode based on the set temperature and a number of parameters including outside air temperature, solar loading, and a measure of the actual air temperature in the cabin.

A typical prior art control is illustrated by the block diagram of FIG. 1A, the calculation diagram of FIG. 1B, and the control output diagram of FIG. 1C. As indicated in FIG. 1A, a calibrated constant K and a number of terms based on the ambient or outside air temperature (Tamb), solar loading (Tsolar), desired temperature setting (Tset), and in-car temperature (Tin-car) are developed from sensor information and calibrated gains F1–F4, and combined at summing junction 10 to form a Program Number. The Program Number is applied to a Table 12 which outputs control settings for blower speed (BLOWER), air discharge temperature (DISCHARGE) and air delivery mode (MODE). The control settings are applied to the HVAC controller 14, which in turn, is connected to the CABIN 16 by a number of air delivery ducts 18. The HVAC controller 14 measures the actual air discharge temperature with one or more duct temperature sensors 20, and controls a refrigerant compressor and temperature mix doors (not shown) to satisfy the commanded discharge temperature(s). Such controls, in turn, influence the temperature in the CABIN 16, which is detected by the in-car temperature sensor 22. As indicated in FIG. 1B, the Tin-car, Tsolar and Tamb terms are considered as corrections, and oppose the sum of K and the Tset terms in computing the Program Number. As indicated on the horizontal axis of FIG. 1B, increasingly lower Program Numbers correspond to increased cooling demand, and increasingly higher Program Numbers correspond to increased heating demand. FIG. 1C illustrates in general how the Table 12 derives the control settings for BLOWER, DISCHARGE and MODE, based on the Program Number. In the illustration, MODE comprises two control settings: one for air inlet source (RECIRC or OUTSIDE) and one for air outlet location (PANEL, BI-LEVEL or FLOOR). The blower speed (BLOWER) varies between high and low settings, as does the air discharge temperature (DISCHARGE).

While the outside air temperature and the solar loading can be determined with a fair degree of accuracy, the cabin (in-car) temperature is difficult to accurately determine because the temperature sensing element has to be hidden and aspirated with cabin air, and typically ends up being installed in a less than ideal location from a sensing performance standpoint. For these and other reasons, in-car temperature measurements frequently exhibit a lagging response time and drift, which can degrade the performance of the overall control system, possibly requiring repeated operator adjustment of the temperature setting in order to achieve the desired comfort level. Furthermore, in-car temperature sensing significantly adds to the hardware, calibration and installation cost of the system.

Accordingly, it has been proposed to eliminate the conventional in-car temperature sensor. For example, the U.S. Pat. No. 5,810,078, issued Sep. 22, 1998, discloses a control system which calculates a theoretical in-car temperature by solving a coupled set of ordinary differential equations, and then adjusts the system control variables in closed-loop fashion based on the deviation of the calculated in-car temperature from the desired in-car temperature. However, such an approach necessitates additional sensors, is subject to the usual closed-loop stability concerns, and requires a relatively high degree of computational capability by the system controller.

Accordingly, what is desired is a control system which eliminates the conventional in-car temperature sensor and the performance degradation due to its lagging response time and drift, while not increasing the overall cost and complexity of the system.

SUMMARY OF THE INVENTION

The present invention is directed to an improved performance and cost-effective control for an automatic motor vehicle HVAC system in which the system variables are controlled without regard to a measured in-car temperature during steady-state conditions, and in which the steady-state control is modified during transient conditions by a time-dependent open-loop compensation term, referred to herein as INCAR. The initial value of INCAR, a target value and a time rate of change are initialized as a function of environmental and system conditions at the onset of the transient condition. At ignition key-on, INCAR is initialized in accordance with an estimate of the in-car temperature, and exponentially adjusted toward a predetermined reference temperature (target) corresponding to the expected cabin air temperature at the conclusion of the transient, and at a rate corresponding to the expected rate of change of cabin air temperature. Preferably, INCAR is also adjusted for door opening and closing. At ignition key-off, INCAR is initialized at its current value, and exponentially adjusted toward a target temperature based on ambient air temperature and solar loading, to form a basis for in-car temperature initialization at the next ignition key-on. For extended key-off periods, an average of the temperature readings of the air discharge temperature sensors may be used to initialize INCAR.

BRIEF DESCRIPTION OF THE DRAWINGS

FIGS. 1A–1C illustrate a prior art automatic HVAC control system. FIG. 1A is a is a block diagram of the system, FIG. 1B is a calculation diagram for the system, and FIG. 1C is a control output diagram for the system.

FIG. 3 is an executive or main loop flow diagram, FIG. 4 details a portion of the main loop flow diagram concerning INCAR initialization at ignition key-on, FIG. 5 details a portion of the main loop flow diagram concerning INCAR initialization at door opening, FIG. 6 details a portion of the main loop flow diagram concerning INCAR initialization at door closing, and FIG. 7 details a portion of the main loop flow diagram concerning INCAR initialization at ignition key-off.

DESCRIPTION OF THE PREFERRED EMBODIMENT

Figure 2:
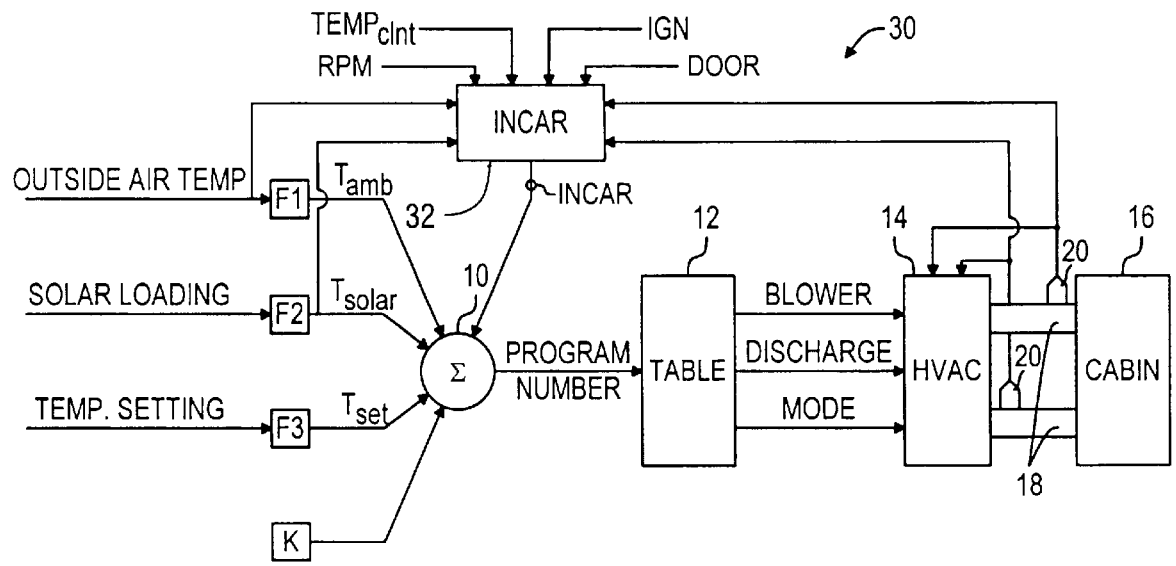
FIG. 2 is a block diagram of an automatic HVAC control system according to this invention.

Referring to FIG. 2, the reference numeral 30 generally designates a motor vehicle HVAC control system according to this invention. Compared to the prior art system block diagram of FIG. 1A, the system of FIG. 2 lacks the in-car temperature sensor 22 and corresponding feedback term Tin-car, and additionally includes a block 32 pertaining to the development of a time-dependent open-loop compensation term, referred to herein as INCAR. The inputs used in deriving the term INCAR include the outside air temperature, the solar compensation term Tsolar, the outputs of the duct temperature sensors 20, and other inputs such as engine RPM, coolant temperature TEMPclnt, ignition status IGN, and door status DOOR. As with the feedback term Tin-car, the open loop compensation term INCAR is applied as an input to summing junction 10, and it reduces the Program Number in the sense illustrated in FIG. 1B. In other respects, the diagram of FIG. 2 resembles that of FIG. 1, and is not discussed in further detail at this point.

In general, the term INCAR is used to push or influence the Program Number during transient operating modes so as to drive the system toward a steady state operating mode. During steady state operation, INCAR remains at a predetermined reference value, such as 75°, and the controls (BLOWER, DISCHARGE, MODE) are adjusted for changes in outside air temperature, solar loading and changes in the desired temperature setting. The principle transient condition occurs at ignition key-on, but INCAR is also used to compensate for transients due to door opening and closing. Ignition key-off is also recognized as the onset of a transient condition, and the term INCAR is updated to reflect the transition of the cabin temperature toward a target temperature determined by the ambient temperature and solar loading (which are also subject to change). For short key-off periods (short soak) of about two hours or less, the key-off INCAR value may be used to initialize the key-on INCAR value, while for longer key-off periods (long soak), INCAR may be initialized at key-on based on an average of the duct temperature sensor measurements. In numerous instrumented trials, we have found that for each of these transient conditions, the INCAR value may be conveniently and reliably modeled as a first-order exponential function by specifying a initial temperature value, a target temperature value, and an exponential time constant at the onset of the transient condition. Algebraically, this may be expressed as:

$$INCAR = TEMPtar + (TEMPinit - TEMPtar) * EXP \qquad (1)$$

where TEMPtar is the target temperature and TEMPinit is the temperature at the onset of the transient condition. The term EXP is an exponential factor having a value of $e^{-t/\tau}$, where t is the elapsed time (also referred to herein as Telapsed) and $\tau$ is the exponential time constant. In practice, it is convenient to determine EXP by table look up as a function of elapsed time Telapsed and the desired time constant TAU.

It will be understood that most of the blocks depicted in FIGS. 1A and 2 are commonly carried out with a programmed micro-controller, including numerous look-up tables for storing calibrated values used in the above-described control. The flow diagrams of FIGS. 3–7 represent computer program instructions executed by such a micro-controller for carrying out the control of this invention.

Figure 3:
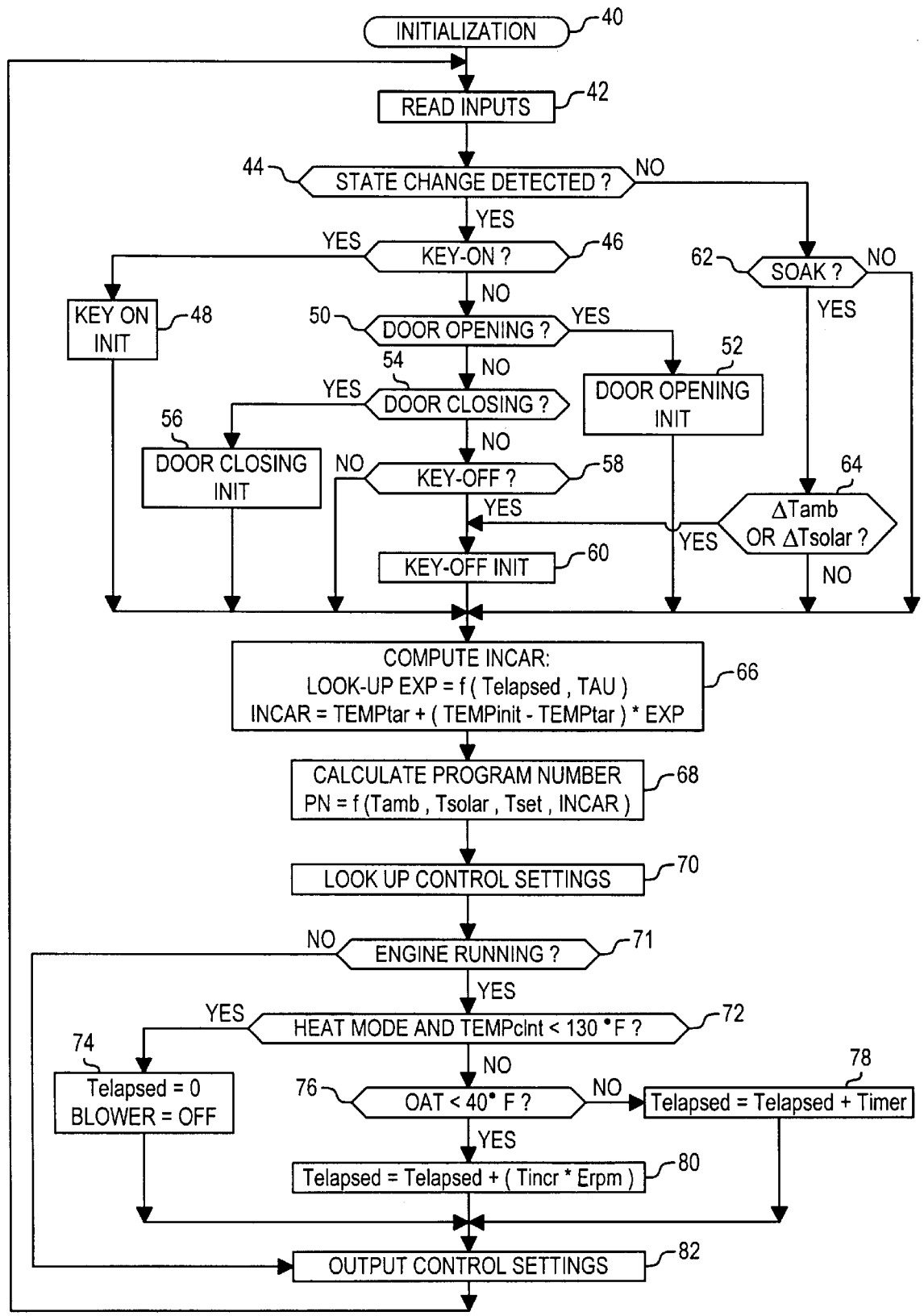

The flow diagram of FIG. 3 may be thought of as a main or executive program that is repeatedly executed so long as power is supplied to the system 30. In the preferred embodiment, this includes key-off periods, although it is recognized that in certain long soak conditions, it may be desired to remove power from the system 30 in order to conserve battery energy. Referring to FIG. 3, the reference numeral 40 designates a series of initialization instructions executed each time power is first applied to the system 30 for initializing the value of various parameters, control variables, flags, etc. Thereafter, the blocks 42–82 are repeatedly executed, as indicated by the return flow line 84. The various sensor inputs are read at block 42; this may include the outside air temperature (OAT), the solar loading (Tsolar), the desired temperature setting (TEMPset), and the temperature readings (TEMPdtm) of the duct temperature sensors 20.

Once the inputs have been read, block 44 determines if a state change indicative of the onset of a transient condition has been detected; such state changes include ignition key-on and key-off, door opening, and door closing. If the state change is an ignition key-on, as determined at block 46, the block 48 is executed to initialize the INCAR variables (TEMPinit, TEMPtar, and TAU) for key-on. If the state change is a door opening, as determined at block 50, the block 52 is executed to re-initialize the INCAR variables for door opening. If the state change is door closing, as determined at block 54, the block 56 is executed to initialize the INCAR variables for door closing. And finally, if the state change is an ignition key-off, as determined at block 58, the block 60 is executed to initialize the INCAR variables for key-off. The blocks 48, 52, 56 and 60 are detailed in the flow diagrams of FIGS. 4, 5, 6 and 7, respectively. As indicated at blocks 62 and 64, the key-off initialization of block 60 is repeated if the ambient or solar conditions (ATamb, ATsolar) change significantly during a soak condition.

Once the INCAR variables (TEMPinit, TEMPtar, and TAU) have been determined, the blocks 66–70 are executed to compute INCAR, to calculate the Program Number, and to look-up the control output settings (BLOWER, DISCHARGE, MODE). The value of INCAR is computed as described above in reference to equation (1), with the exponential factor EXP being determined as a function of Telapsed and TAU. The Program Number is computed as a function of Tamb, Tsolar, Tset, K and INCAR, as described in FIG. 2, and the control settings are determined as described above in respect to FIG. 1C.

The block 71 determines if the vehicle engine is running. If so, the blocks 72–80 are executed to suitably increment Telapsed; if not, the blocks 7280 are skipped so that Telapsed is not incremented. The block 72 determines if the system is in the HEAT mode (based on Program Number) and the engine coolant temperature TEMPclnt is less than 130° F. If so, then the vehicle engine has not warmed sufficiently to provide heat, and the block 74 is executed to maintain the elapsed time indicator Telapsed at zero, and to set BLOWER to OFF. Once the coolant temperature warms to 130° F., the BLOWER is set according to the look-up of block 70, and the blocks 76–80 are executed to suitably increment Telapsed. If the outside air temperature is above 40° F., as determined at block 76, the block 78 increments Telapsed by a standard loop time increment Tincr. However, if the outside air temperature is below 40° F., the standard loop time increment Tincr is adjusted by a factor based on the average engine speed, Erpm, as indicated at block 80. This reflects the fact that the engine coolant temperature generally rises as a function of engine speed, and compensates the INCAR value to accommodate different coolant warm-up rates. Finally, the control settings are provided as an output to the HVAC control loop, as indicated at block 82.

Figure 4:
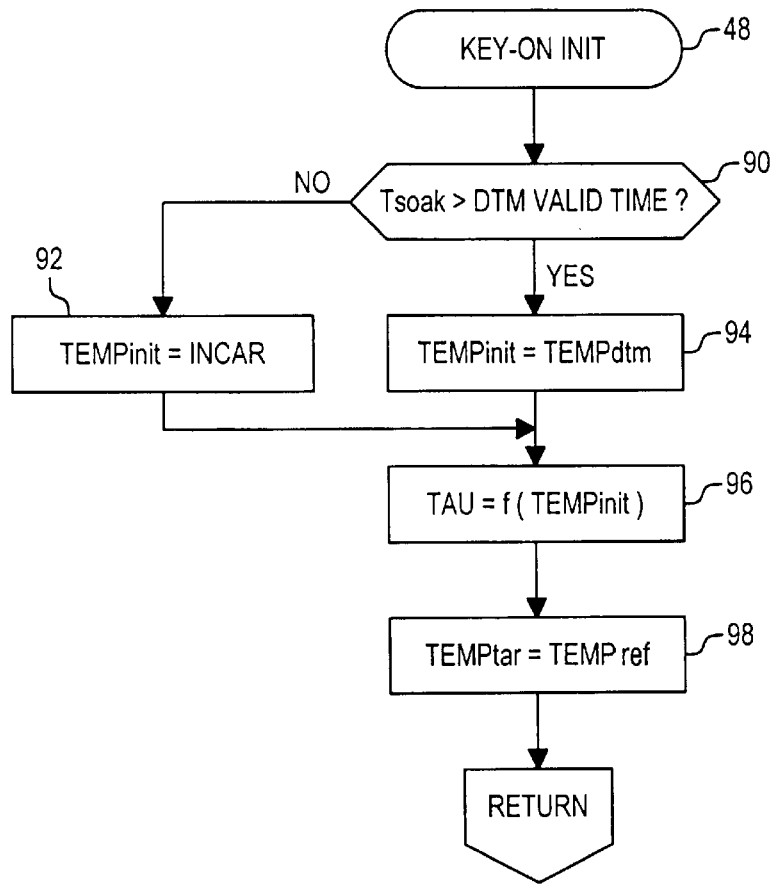
FIGS. 3–7 are flow diagrams representative of computer program instructions executed by the HVAC control system of FIG. 2 in carrying out a control according to this invention.
Figure 8:
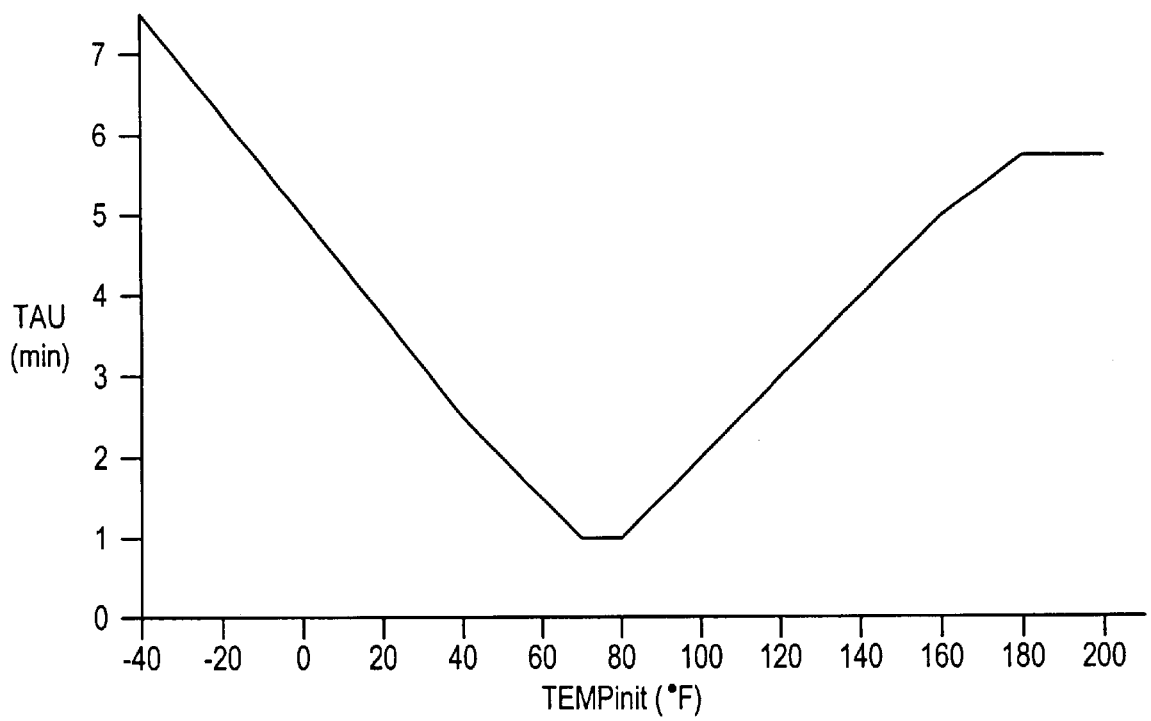
FIG. 8 graphically depicts an INCAR time constant TAU as a function of initial temperature at the onset of a transient condition.

Referring to the flow diagram of FIG. 4, the INCAR variables are initialized at key-on by first determining the duration Tsoak of the key-off, or soak, period. If Tsoak is less than a reference time (DTM VALID TIME) such as two hours, as determined at block 90, block 92 sets the initial in-car temperature term TEMPinit equal to the present value of INCAR. For longer soak intervals, the block 94 sets the initial temperature term TEMPinit equal to the average of the temperatures measured by the duct temperature sensors 20. In installations where the sensors 20 are not available, it is possible to use INCAR as the initial temperature term regardless of the soak time, or to determine the initial temperature from an inexpensive non-aspirated thermistor, or from a thermistor located in the controller circuit. Block 96 is then executed to initialize the time constant TAU as a function of TEMPinit. An exemplary function is depicted in the graph of FIG. 8, which shows TAU being relatively long at extreme values of TEMPinit, and shortest when TEMPinit is near the predetermined reference temperature TEMPref of 75° F. Thus, the scheduling of TAU reflects the fact that more time is needed to condition the cabin air to comfort at extreme thermal load conditions. Also, it reflects the fact that, in general, more time is required to warm the cabin than to cool it. Variations due to solar effects are compensated by the solar term Tsolar. Finally, the block 98 is executed to set the target temperature TEMPtar to the predetermined reference temperature TEMPref of 75° F. In general, this represents a nominal steady state cabin temperature, and typically is the temperature at which the ambient and solar correction terms Tamb, Tsolar are calibrated.

Figure 5:
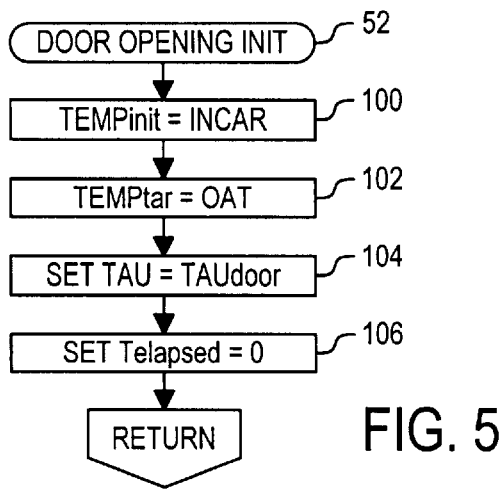

The flow diagram of FIG. 5 shows how the INCAR variables are reinitialized when a vehicle door is opened. The open door allows air at ambient temperature to enter the cabin, with the potential for rapidly changing the in-car air temperature. To compensate for this, the INCAR variables are initialized so that the INCAR value exponentially approaches the outside air temperature. Thus, blocks 100–106 are executed to reset TEMPinit to the current INCAR value, to set TEMPtar to the outside air temperature OAT, to set TAU to a predetermined door opening time constant TAUdoor, and to reset Telapsed to zero. If the system has the ability to determine how many doors are open at once, the value of TAUdoor may be reduced by a factor according to the number of doors open.

Figure 6:
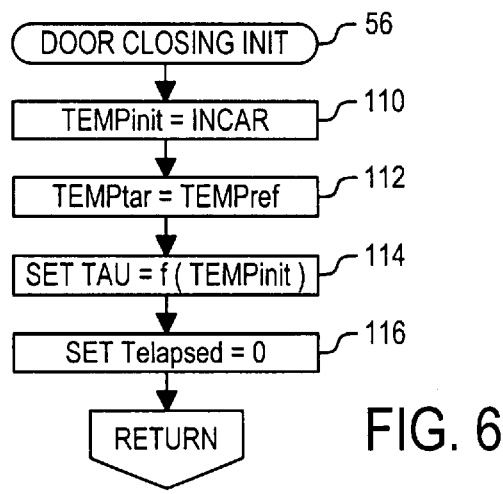

The flow diagram of FIG. 6 shows how the INCAR variables are reinitialized when the vehicle door(s) is closed after standing open. In this case, blocks 110–116 are executed to reset TEMPinit to the current INCAR value, to set TEMPtar to the reference temperature TEMPref, to set TAU as a function of TEMPinit as described above in respect to the key-on initialization, and to reset Telapsed to zero.

Figure 7:
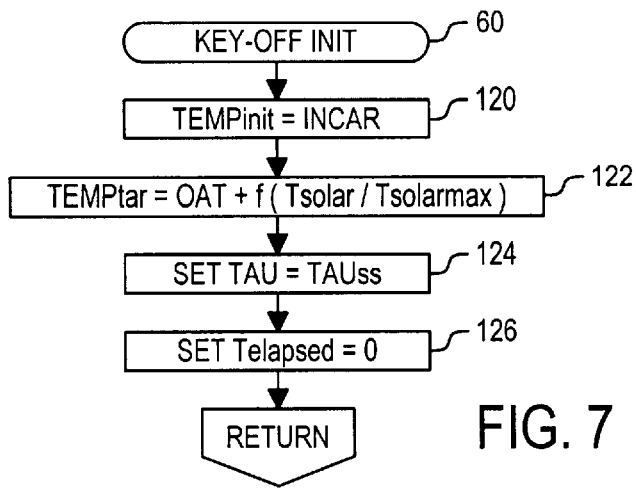

Finally, the flow diagram of FIG. 7 shows how the INCAR variables are re-initialized at ignition key-off to keep track of the cabin temperature during a soak period. In this case, blocks 120–126 are executed to reset TEMPinit to the current INCAR value, to set TEMPtar to a value based on outside temperature OAT and solar loading, to set TAU to a predetermined value TAUss corresponding to the thermal time constant of the vehicle body, and to reset Telapsed to zero. In determining the target temperature TEMPtar, the solar loading is taken into account by increasing OAT by a factor based on the ratio (Tsolar/Tsolannax), where Tsolarmax is a maximum value for the solar compensation term Tsolar. Also, as mentioned above in respect to FIG. 3, the blocks 120–126 may be re-executed one or more times during a soak interval if the ambient temperature or solar loading change significantly.

In the manner described above, the open-loop compensation term INCAR is initialized at ignition key-on and thereafter repeatedly re-initialized in response to detected transient conditions so as to drive the HVAC control system toward steady state operation. Despite the fact that the in-car temperature is not directly measured, field testing has shown that the HVAC performance with the control of this invention is actually improved compared to prior automatic systems that rely on cabin temperature measurement. In actuality, this just reflects how difficult it is to accurately measure cabin temperature in a production vehicle.

While this invention has been described in reference to the illustrated embodiment, it is expected the various modifications in addition to those suggested herein will occur to those skilled in the art. For example, while the illustrated system distills the various inputs into a single Program Number from which the control settings are determined, the invention equally applies to systems in the control settings are determined as a function of two or more individual input variables; in either system, the term INCAR is used to represent the vehicle cabin temperature. Accordingly, it should be understood that the scope of this invention is not limited to the illustrated embodiment, and that controls incorporating such modifications may fall within the intended breadth of the appended claims.

What is claimed is:

1. A method of estimating cabin air temperature in a vehicle automatic HVAC system that develops HVAC control settings in response to the cabin air temperature estimate, a desired cabin air temperature, detected solar loading, and a measure of ambient air temperature, the method comprising the steps of:

detecting an onset of a transient operating condition;

estimating an initial temperature of the cabin air at the detected onset;

determining a target temperature corresponding to an expected cabin air temperature at a conclusion of the transient operating condition;

determining an expected rate of change of the cabin air temperature during the transient condition; and estimating the cabin air temperature based on the estimated initial temperature, the target temperature and the expected rate of change.

2. The method of claim 1, wherein the transient operating condition is an initiation of vehicle operation, and the target temperature is a predetermined constant.

3. The method of claim 1, wherein the HVAC system includes a system sensor for determining an air discharge temperature, the transient operating condition is an initiation of vehicle operation, and the initial temperature is estimated based on the system sensor.

4. The method of claim 1, wherein the transient operating condition is an initiation of vehicle operation, and the expected rate of change is determined as a function of the estimated initial temperature.

5. The method of claim 1, wherein the estimate of cabin air temperature is determined in accordance with the expression:

$$TEMPtar + (TEMPinit - TEMPtar)*EXP$$

where TEMPtar is the target temperature, TEMPinit is the initial temperature, and EXP is an exponential factor determined as a finction of an elapsed time of the transient and the expected rate of change.

6. The method of claim 5, wherein the elapsed time of the transient maintained at an initial setting if the HVAC system is in a heating mode, and an engine coolant temperature is less than a reference temperature.

7. The method of claim 6, wherein once the engine coolant temperature reaches the reference temperature, the elapsed time of the transient is constrained to a rate of increase determined as a function of average engine speed.

8. The method of claim 1, wherein the HVAC system includes a system sensor for determining an air discharge temperature, and the method includes the steps of:
   updating the cabin air temperature estimate following a termination of vehicle operation; and
   upon detection of a transient condition due to a subsequent initiation of vehicle operation, estimating the initial temperature is estimated according to one of the cabin air temperature estimate at such subsequent initiation and the system sensor.

9. The method of claim 1, including the steps of:
   updating the cabin air temperature estimate following a termination of vehicle operation; and
   upon detection of a transient condition due to a subsequent initiation of vehicle operation, estimating the initial temperature according to the cabin air temperature estimate at such subsequent initiation.

10. The method of claim 9, including the steps of wherein the cabin air temperature estimate is updated following the termination of vehicle operation based on the cabin air temperature estimate at such termination, the measure of ambient air temperature, the detected solar loading, and an elapsed time of such termination.

11. The method of claim 9, wherein the cabin air temperature estimate is updated following termination of vehicle operation in accordance with the expression:

$$TEMPtar+(TEMPinit-TEMPtar)*EXP$$

where TEMPtar is a target temperature initialized based on the measure of ambient air temperature and the detected solar loading, TEMPinit is an initial temperature initialized based on the cabin air temperature estimate at such termination, and EXP is an exponential factor determined as a function of an elapsed time of such termination and an estimated thermal time constant of said vehicle.

12. The method of claim 11, including the step of re-initializing the target temperature, the initial temperature and the elapsed time if the measure of ambient air temperature and/or the detected solar loading change by at least a predetermined amount.

13. The method of claim 1, wherein the transient operating condition is a vehicle door opening, and the initial temperature is estimated according to the cabin air temperature estimate at the detected onset of said door opening, and the target temperature is determined according to the measure of ambient air temperature.

14. The method of claim 13, wherein the expected rate of change is determined in accordance with a predetermined time constant for door openings.

15. The method of claim 13, wherein the transient operating condition is a vehicle door closing, and the initial temperature is estimated according to the cabin air temperature estimate at the detected onset of said door closing, the target temperature is a predetermined constant, and the expected rate of change is determined as a function of an estimated initial temperature.

* * * * *